United States Patent
Kulkarni

(10) Patent No.: US 10,858,911 B2
(45) Date of Patent: Dec. 8, 2020

(54) BIDIRECTIONAL CHOPPING OF HIGH VOLTAGE POWER IN HIGH TEMPERATURE DOWNHOLE TOOLS TO REDUCE TOOL SIZE

(71) Applicant: Saurabh Kulkarni, Houston, TX (US)

(72) Inventor: Saurabh Kulkarni, Houston, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 1237 days.

(21) Appl. No.: 14/845,693

(22) Filed: Sep. 4, 2015

(65) Prior Publication Data
US 2017/0067319 A1    Mar. 9, 2017

(51) Int. Cl.
| | | |
|---|---|---|
| *H02M 7/68* | (2006.01) | |
| *E21B 41/00* | (2006.01) | |
| *E21B 47/12* | (2012.01) | |
| *H02M 5/293* | (2006.01) | |
| *H02M 7/5387* | (2007.01) | |
| *H02M 5/297* | (2006.01) | |
| *H02M 5/22* | (2006.01) | |

(52) U.S. Cl.
CPC .............. *E21B 41/00* (2013.01); *E21B 47/12* (2013.01); *H02M 5/293* (2013.01); *H02M 7/68* (2013.01); *H02M 5/22* (2013.01); *H02M 5/297* (2013.01); *H02M 7/5387* (2013.01)

(58) Field of Classification Search
CPC ......... H02M 2001/007; H02M 7/5387; H02M 7/66; H02M 7/68; H02M 7/70; H02M 7/72; H02M 7/75; H02M 7/753; H02M 7/757; H02M 7/7575; H02M 7/758; H02M 7/77; H02M 7/79; H02M 7/797; H02M 7/81; H02M 5/40; H02M 5/42; H02M 5/44; H02M 5/443; H02M 5/45; H02M 5/4505; H02M 5/451; H02M 5/452; H02M 5/458; H02M 5/4585; H02M 5/293; H02M 5/297; H02M 5/275; H02M 5/22
USPC .... 363/37, 97, 98, 131, 132, 65, 71, 72, 35, 363/135, 136, 137
See application file for complete search history.

(56) References Cited

U.S. PATENT DOCUMENTS

| | | |
|---|---|---|
| 5,057,990 A | 10/1991 | Gulczynski |
| 6,680,641 B1 | 1/2004 | Orr |
| 7,679,941 B2 | 3/2010 | Raju et al. |

(Continued)

FOREIGN PATENT DOCUMENTS

CN    102185496 A    9/2011

OTHER PUBLICATIONS

Eom et al.,; "Analysis of a Novel Soft Switching Bidirectional DC-DC Converter," Journal of Power Electronics, vol. 12, No. 6, Nov. 2012, pp. 859-868.

(Continued)

*Primary Examiner* — Bryan R Perez
(74) *Attorney, Agent, or Firm* — Cantor Colburn LLP

(57) ABSTRACT

A downhole tool and a method for operating the downhole tool are disclosed. A first power signal is supplied to the downhole tool from a power source at a first frequency. A bidirectional chopper at the downhole tool chops the first power signal to generate a second power signal having a second frequency greater than the first frequency. The second power signal is used to operate the downhole tool.

16 Claims, 4 Drawing Sheets

(56) References Cited

U.S. PATENT DOCUMENTS

| | | | |
|---|---|---|---|
| 7,834,597 B1* | 11/2010 | Shekhawat | H02M 1/32 323/224 |
| 8,644,037 B2 | 2/2014 | Raju et al. | |
| 8,971,057 B2 | 3/2015 | Smith | |
| 2003/0185029 A1* | 10/2003 | York | H02M 5/271 363/124 |
| 2006/0103365 A1 | 5/2006 | Ben-Yaacov | |
| 2006/0152085 A1 | 7/2006 | Flett et al. | |
| 2009/0003021 A1* | 1/2009 | Tsukamoto | H02M 3/1588 363/74 |
| 2011/0170320 A1* | 7/2011 | Coenen | E21B 4/04 363/35 |
| 2013/0107597 A1* | 5/2013 | Mabuchi | H02M 7/48 363/124 |
| 2013/0169035 A1 | 7/2013 | Nakashima | |
| 2013/0322139 A1 | 12/2013 | Lee et al. | |
| 2014/0169045 A1 | 6/2014 | Ueno | |
| 2014/0268959 A1 | 9/2014 | Frohman et al. | |
| 2016/0259086 A1* | 9/2016 | Grente | E21B 47/122 |

OTHER PUBLICATIONS

Kang et al.; "Pulse Modulated AC Voltage Regulator Using Bidirectional Active Switches with Different Control Strategies," Electrical Machines and Systems, Proceedings of the Eighth International Conference, vol. 2, 2005, pp. 1107-1111.

Mogstad; "New switching pattern for AC/AC converters with RB-IGBTs for offshore wind parks," Norwegian University of Science and Technology, Jun. 2008, pp. 1-103.

Mokhalodi; Internet Article, "Development of a Universal Bidirecctional Galvanic Isolated Switch Module for Power Converter Applications," retrieved from htt;/196.21.64.68/handle/10352/176; May 11, 2015; pp. 1-2.

Norrga; "An Experimental Study of a Soft-switched Isolated AC/DC Converter without Auxiliary Circuit,"; 2004 35th Annual IEEE Power Electronics Specialists Conference, Aachen, Germany, 2004, pp. 2406-2412.

\* cited by examiner

BIDIRECTIONAL CHOPPING OF HIGH VOLTAGE POWER IN HIGH TEMPERATURE DOWNHOLE TOOLS TO REDUCE TOOL SIZE

BACKGROUND OF THE DISCLOSURE

1. Field of the Disclosure

The present disclosure provides a method and apparatus for providing power to a tool in a wellbore, and in particular, to a method of powering the downhole tool from a surface location so as to reduce the size of transformers used in the downhole tool.

2. Description of the Related Art

Various processes in petroleum exploration include the use of a downhole tool extending into a wellbore from a surface location. Wireline tools, for example, include a downhole tool suspended from the surface location via a cable that supports the downhole tool and which includes electrical conductors for providing power from a power source at the surface location to the wireline tool. Transformers are often used in these downhole tools in order to step down high voltage alternating current (AC) provided from the surface power source and to provide galvanic isolation between the power source and the electrical equipment of the downhole tool. The size requirements of a transformer are directly related to the frequency of the power signal. It is further noted that as power load increases, transformers are often connected in parallel to meet power requirements. Given that space in limited in downhole tools, it is desirable to use transformers that are as small as possible. One way of reducing the size of the transformers in the downhole tool is to increase the frequency of the alternating current (AC) power sent from the surface. However, high frequency voltage along the cable increases transmission losses and requires the implementation of new power sources at the surface location. The present invention therefore provides a method and apparatus for providing power to downhole tools with reduced transformer size.

SUMMARY OF THE DISCLOSURE

In one aspect the present disclosure provides a method of operating a downhole tool, the method including: supplying a first power signal from a power source at a first frequency; chopping the first power signal at the downhole tool to generate a second power signal having a second frequency greater than the first frequency; and using the second power signal to operate the downhole tool.

In another aspect, the present invention provides a downhole tool that includes a bidirectional chopper that receives a first power signal at a first frequency and chops the first power signal to generate a second power signal having a second frequency greater than the first frequency; and a unit of the downhole tool that is powered using the second power signal.

In yet another aspect, the present invention provides a system for operating a downhole tool, including: a power source configured to supply a first power signal at a first frequency; a bidirectional chopper configured to receive the first power signal and chop the first power signal to generate a second power signal having a second frequency greater than the first frequency; and a unit of the downhole tool configured to operate using the second power signal.

Examples of certain features of the apparatus and method disclosed herein are summarized rather broadly in order that the detailed description thereof that follows may be better understood. There are, of course, additional features of the apparatus and method disclosed hereinafter that will form the subject of the claims.

BRIEF DESCRIPTION OF THE DRAWINGS

For detailed understanding of the present disclosure, references should be made to the following detailed description, taken in conjunction with the accompanying drawings, in which like elements have been given like numerals and wherein.

DETAILED DESCRIPTION OF THE DISCLOSURE

Figure 1:
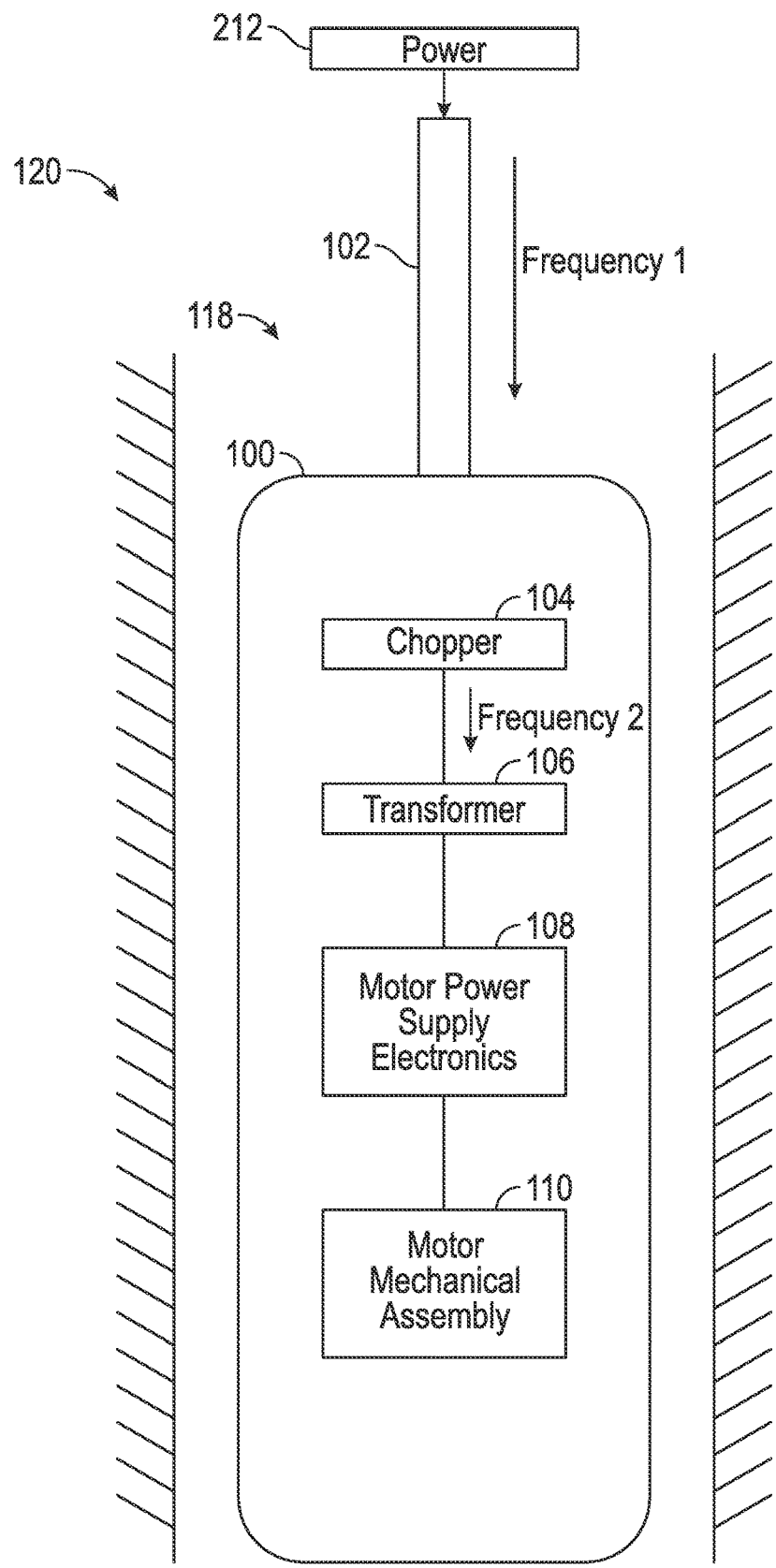
FIG. 1 shows an exemplary downhole tool in one embodiment of the present invention which employs a bidirectional chopper for converting a frequency of a power signal at the downhole tool.
Figure 2:
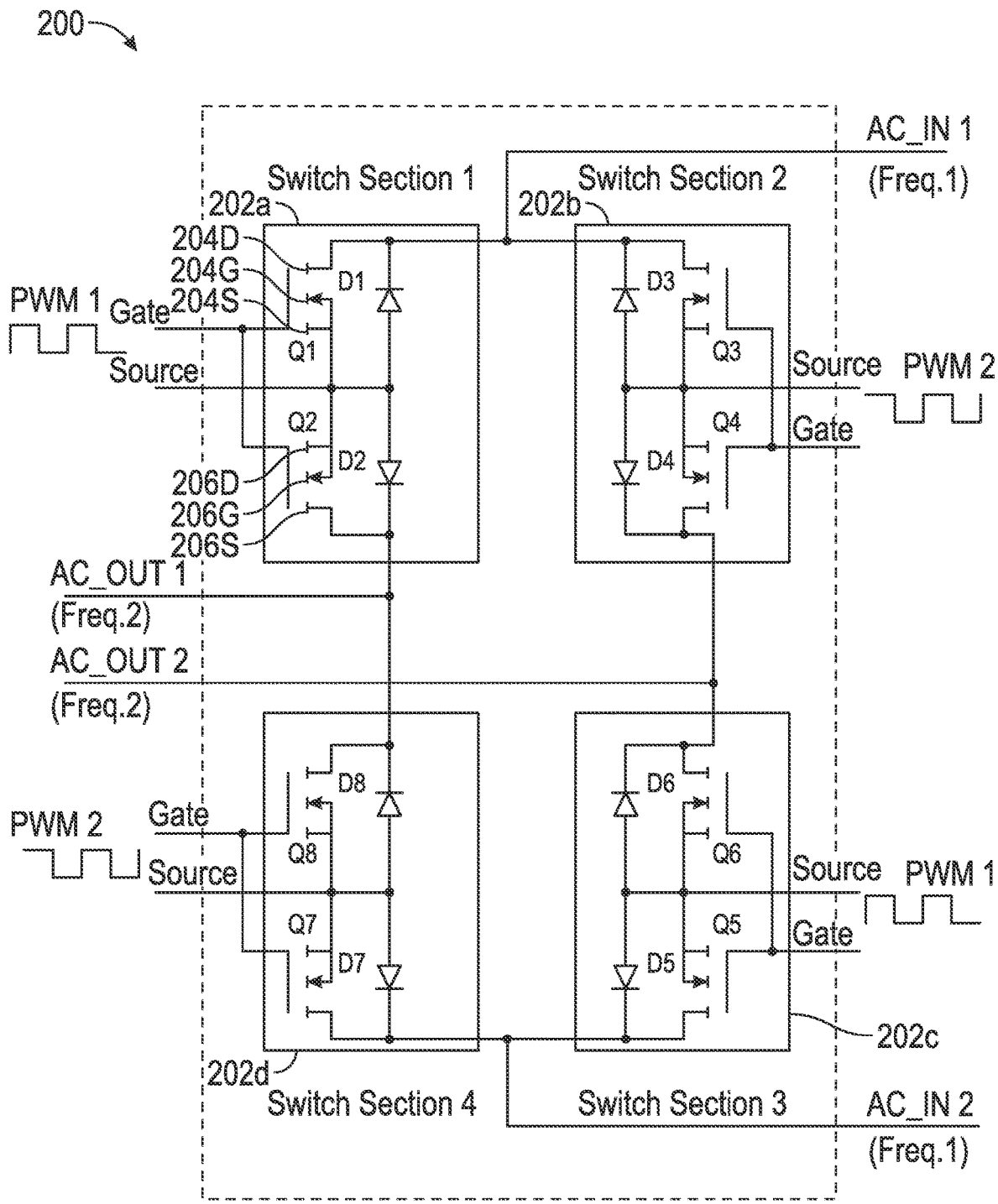
FIG. 2 shows a detailed view of the exemplary bidirectional chopper of the downhole tool in one embodiment.

FIG. 1 shows an exemplary downhole tool 100 in one embodiment of the present invention which employs a bidirectional chopper 104 for converting a frequency of a power signal at the downhole tool. In the illustrative embodiment shown in FIG. 1, the downhole tool 100 is a wireline tool. However, in alternate embodiments, the downhole tool 100 may be a drilling tool, including a measurement-while-drilling tool or a logging-while drilling tool or other downhole tools. The downhole tool 100 is lowered into a wellbore 118 penetrating an earth formation 120. A cable 102 extends from a power supply 122 (generally at a surface location) to the downhole tool 100 in the wellbore 118. The power supply 122 provides a first power signal to the downhole tool 100 along cable 102. The first power signal is provided along cable 102 to the downhole tool 100 at a first frequency. The first frequency can be a standard power frequency. The standard power frequency can be about 50 Hertz (Hz) or about 60 Hz in various embodiments. However, the first frequency is not meant to be limited to these frequencies. The downhole tool 100 includes a bidirectional chopper circuit 104 that changes a frequency of the power signal. In various embodiments, the chopper circuit 104 receives the first power signal from the cable 102 and generates a second power signal by chopping the first power signal, thereby producing the second power signal having a second frequency. The second frequency is within a range from about 400 Hz to about 1 kHz in various embodiments, although other frequencies and frequency ranges may be achieved using the bidirectional chopper circuit 104. In one aspect of the invention, the second frequency is greater than the first frequency A transformer 106 receives the chopped power signal at the second frequency from the bidirectional chopper circuit 104 and produces a high voltage power signal as an output signal which can be used at various downhole tool elements, such as Motor Power Supply Electronics 108 which drives Motor Mechanical Assembly 110 as well as any other circuitry of the downhole tool FIG. 2 shows a detailed view of the exemplary bidirectional chopper 104 of the downhole tool 100 in one embodiment. The bidirectional chopper disclosed herein employs eight discrete silicon carbide MOSFETs (metal-oxide-semiconductor field-effect transistors). Suitable transistors may include, but are not limited to, conventional silicon transistors and insulated-gate bipolar transistor (IGBTs), and can be made from wide band-gap materials, including, but not limited to, silicon carbide and gallium nitride. Silicon carbide transistors are generally used as the transistors. Silicon carbide transistors are known to work at temperatures above 200 degrees Celsius. Commercial AC switches using thyristors do not work at high temperatures, while insulated gate bipolar transistors are generally usable only up to about 200 degrees Celsius.

Using the bidirectional AC chopper 114, an AC waveform at a first frequency may be chopped to generate a waveform at second frequency ("switching frequency ($f_{sw}$)") within a frequency range that is higher than the first frequency. In various embodiments, the first frequency is in a range from about 50 Hz to about 60 Hz and the second frequency is in a range from about 400 Hz to about 1 kHz. The chopper shifts the energy of the waveform from 60 Hz to $f_{sw}$+−60 Hz. More generally, the chopper shifts the energy of the waveform from a first frequency ("freq_1") to a second frequency ("freq_2") where freq_2=$f_{sw}$+−freq_1. Due to the higher frequency of the chopped signal, the transformer in the downhole tool is reduced in size while still providing the same amount of power as transformer operating at the lower (first) frequency. In various embodiments, the transformers are reduced in size by about a factor of about two when compared to a size of a transformer currently used for transforming a 60 Hz power signal for a same VA rating and input/output voltage values.

The bidirectional chopper 200 includes four switch sections: switch section 1 (202a), switch section 2 (202b), switch section 3 (202c) and switch section 4 (202d). Each switch section includes two transistors with antiparallel diodes. Switch section 1 (202a) includes transistors Q1 and Q2 with antiparallel diodes D1 and D2. Switch section 2 (202b) includes transistors Q3 and Q4 with antiparallel diodes D3 and D4. Switch section 3 (202c) includes transistors Q5 and Q6 with antiparallel diodes D5 and D6. Switch section 4 (202d) includes transistors Q7 and Q8 with antiparallel diodes D7 and D8.

Each switch section of the bidirectional chopper 114 has a same circuitry configuration as the other switch sections. Therefore, switch section 1 (202a) is discussed as a representative of the switch sections 1-4 (202a-202d). Switch section 1 (202a) includes transistors Q1 and Q2. Source 204S of transistor Q1 is electrically coupled and/or connected to source 206S of transistor Q2 so that source 204S and source 206S are at the same electrical potential. Similarly, gate 204G of transistor Q1 is electrically coupled and/or connected to gate 206G of transistor Q2 so that gate 204G and gate 206G are at the same electrical potential. Diode D1 is connected between the source 204S and gate 204G of transistor Q1. Therefore, diode D1 is anti-parallel with transistor Q1. Meanwhile, diode D2 is connected between the source 206S and gate 206G of transistor Q2. Therefore, the diode D2 is anti-parallel with transistor Q2. A pulse width modulated (PWM) signal is received as a control signal at switch section 1 (202a) and is supplied between gates 204G and 206G and sources 204S and 206S such that gates 204G and 206G and sources 204S and 206S all receive the same control signal.

The PWM control signal is supplied to the switch sections (202a-202d) in alternating manner. In particular, the PWM control signal is separated into a PWM1 control signal and PWM2 control signal. The PWM1 control signal and PWM2 control signal are periodic waves that are 180 degrees out of phase with each other. The PWM1 control signal and PWM 2 control signal each have a 50% duty cycle (i.e., is active for half of its period). While the duty cycle of the PWM 1 control signal and PWM 2 control signal is 50%, this is for illustrative purposes only. The amount of the duty cycle can be varied from 50%. Such changes in the duty cycle affect the amplitude of the output signal (AC_OUT1 and AC_OUT 2). Switch section 1 (202a) and switch section 3 (202c) receive PWM1 control signal while switch section 2 (202b) and switch section 4 (202d) receive PWM2 control signal. The input signal (at frequency 1) comes into the bidirectional switch section as "AC_IN1 and AC_IN2" (AC_IN 1 into switch sections 1 and 2, and AC_IN 2 into switch sections 3 and 4). The output signal (at frequency 2) leaves the switch section as "AC_OUT1 and AC_OUT2" (AC_OUT 1 leaving switch sections 1 and 4, and AC_OUT 2 leaving switch sections 2 and 3). The drains of transistors Q1 and Q3 are coupled to an AC_IN 1 signal, which is at a first frequency. The drains of transistors Q5 and Q7 are coupled to an AC_IN 2 signal, which is at a first frequency. The drains of transistors Q2 and Q8 provide an AC_OUT 1 signal at a second frequency, while the drains of transistors Q4 and Q6 provide an AC_OUT 2 signal at a second frequency.

Figure 3:
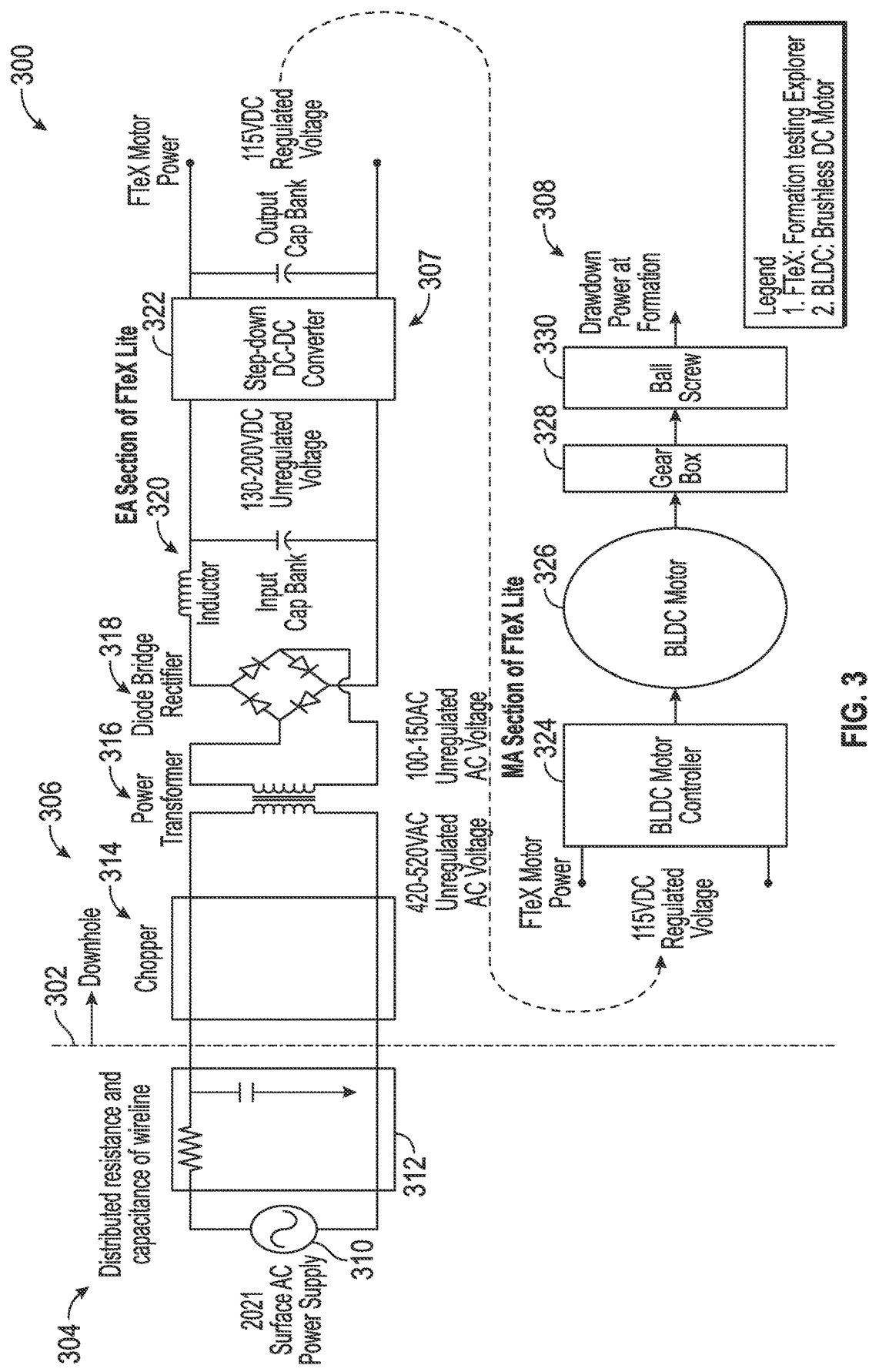
FIG. 3 shows an exemplary circuit diagram for a downhole tool illustrating a placement of the bidirectional chopper with respect to other circuitry of the downhole tool.

FIG. 3 shows an exemplary circuit diagram 300 for a downhole tool illustrating a placement of the bidirectional chopper of the present invention with respect to the other circuitry of the downhole tool. Demarcation line 302 indicates a separation between equipment at a surface location 304 and equipment that is downhole 306. Power supply 310 is located at the surface location 304. The power supply 310 may be an alternating current power supply. A cable 312 extends downhole from the surface location 302. A resistance and capacitance of the cable is shown by the resistor and capacitor in box 312. At the downhole location 306, a motor power delivery scheme for a formation testing explorer tool is shown. The tool includes two sections, an electrical assembly (EA) section 307 and a motor assembly (MA) section 308. The EA section 307 includes a bidirectional chopper 314 (such as the bidirectional chopper of FIG. 2), a transformer 316, a rectifier 318 and a filter 320.

The bidirectional chopper 314 receives a first power signal from the AC power supply 310. The first power signal is in the form of a periodic wave having a first frequency. For illustrative purposes only, the first frequency is from about 50 Hz to about 60 Hz. The bidirectional chopper converts the first power signal having the first frequency to a second power signal having a second frequency. The second frequency is generally a higher frequency than the first frequency. In various embodiments, the second frequency is in a range from about 400 Hz to about 1 kHz, although the present invention is not meant to provide a limitation on the second frequency other than that the second frequency is higher than the first frequency. The second power signal, having been generated at the bidirectional chopper 314, is then received at transformer 316. The transformer 316 may be a step-down transformer in various embodiments. For illustrative purposes only, the second power signal received at the transformer 316 has a voltage amplitude in a range from about 420V AC to about 520V AC and the signal output by the transformer 316 has a voltage amplitude in a range from about 100V AC to about 150V AC, although this is not meant as a limitation of the invention. In addition to changing the amplitude of the received signal, the transformer 316 provides galvanic isolation of the downhole electronic equipment from the power source 310. The AC voltage output from the transformer 316 is received at rectifier 318 which converts the AC voltage to a DC voltage. The DC voltage is then passed through filter 320 to remove voltage transients. The exemplary EA section 307 further includes a step-down DC-DC converter 322 for converting the DC voltage output by the filter 320 to a DC voltage suitable for use at the MA section 308.

The MA section 308 includes a brushless DC motor (BLDC motor) 326, a BLDC motor controller 324, a gearbox 328 and a ball screw 330. The BLDC motor controller 324 controls operation of the BLDC motor 326 and is powered by DC power from the step-down DC-DC converter 322 of the EA section 307. The BLDC motor 326 provides mechanical motion to gear box 328, which translate the mechanical motion of the BLDC motor 326 for use at ball screw 330. In one embodiment, the ball screw 330 may be used to operate machinery for drawing fluid from a formation. Other mechanical devices and mechanical operations can be powered by the BLDC motor 326 in other embodiments of the downhole tool.

Figure 4:
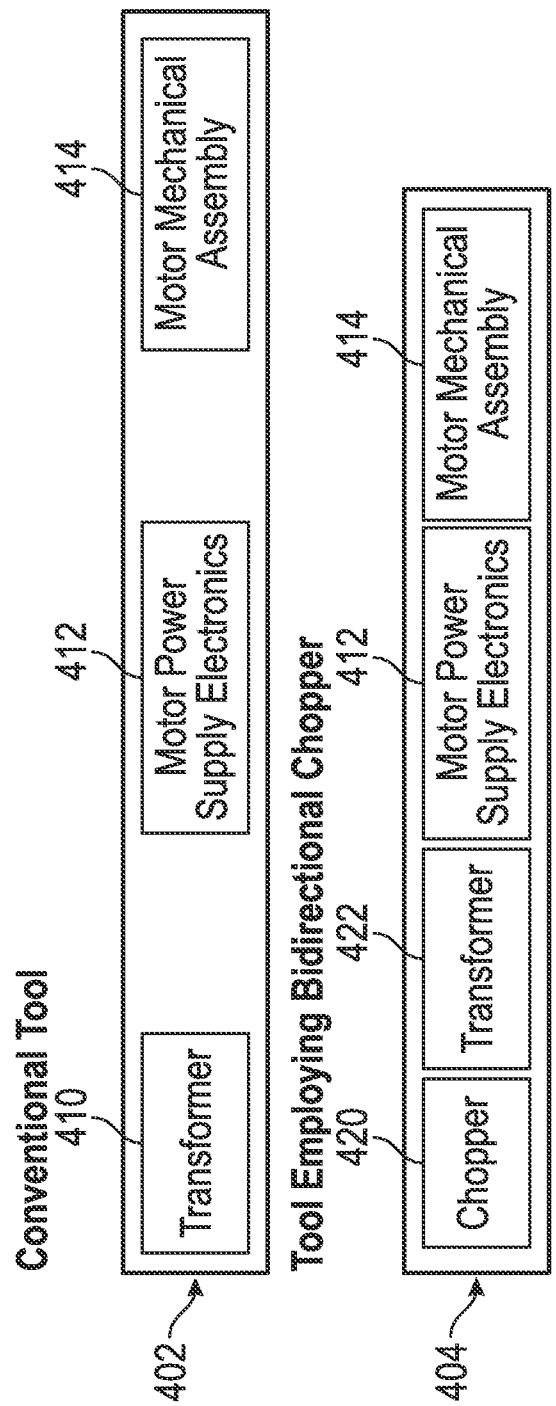
FIG. 4 shows a comparison between a conventional downhole tool and a downhole tool which uses the bidirectional chopper circuit.

FIG. 4 shows a comparison between a conventional downhole tool 402 and a downhole tool 404 or the present invention which uses the bidirectional chopper circuit. The conventional downhole tool 402 includes a transformer 410, motor power and supply electronics 412 and a motor mechanical assembly 414. The transformer 410 generally transforms the amplitude of a first power signal having a first frequency received from an uphole power source to power operations of the conventional downhole tool 402. The transformer 410 outputs a signal at selected power level. The downhole tool 404 of the present invention includes bidirectional chopper 420 and a "reduced-size" transformer 422, as well as the motor power and supply electronics 412 and a motor mechanical assembly 414. The bidirectional chopper 420 receives the first power signal and generates a second power signal at a second frequency higher than the first frequency. By producing the second power signal at the second (higher) frequency, the reduced-size transformer 422 does not need to be as big as the transformer 410 of the conventional downhole tool to generate the same amount of power (i.e., the selected power level) as transformer 410. As a result, the volume taken up by the bidirectional chopper 420 and the reduced-size transformer 422 is less than the volume taken up by the transformer 410. Thus, the size of the downhole tool 404 of the present invention can be smaller than the size of the conventional downhole tool 402. Alternatively, additional equipment can be placed into a downhole tool having the size of the convention downhole tool 402.

Therefore in one aspect, the present disclosure provides a method of operating a downhole tool, including: supplying a first power signal from a power source at a first frequency; chopping the first power signal at the downhole tool to generate a second power signal having a second frequency greater than the first frequency; and using the second power signal to operate the downhole tool. A transformer is used to change a voltage of the second power signal prior to using the second power signal to operate the downhole tool and/or to galvanically isolate the downhole tool from a surface power supply. The size of the transformer is less than a size of another transformer that changes the voltage of the first power signal to operate the downhole tool for a same amount of power. The first power signal is chopped using a bidirectional chopper of the downhole tool. The bidirectional chopper includes four switch sections. A first pulse width modulated (PWM) control signal is received at a first and third of the switch sections and a second PWM control signal is received at a second and fourth of the switch sections. The first PWM control signal and the second PWM control signal are 180 degrees out of phase and have a 50% duty cycle. However, the duty cycle of the first PWM control signal and the second PWM control can be changed to alter an amplitude of the second power signal. At least one of the switch sections includes two transistors with antiparallel diodes and the transistors include at least one of: (i) a silicon transistor; (ii) an insulated-gate bipolar transistor: (iii) a wide band-gap transistor; (iv) a silicon carbide transistor; and (v) a gallium nitride transistor. The sources of the two transistors are electrically coupled and the gates of the two transistors are electrically coupled. In on embodiment, the first frequency is in a range from about 50 Hertz (Hz) to about 60 Hz and the second frequency is in a range between from about 400 Hz to about 1 kHz.

In another aspect, the present disclosure provides a downhole tool, including: a bidirectional chopper that receives a first power signal at a first frequency and chops the first power signal to generate a second power signal having a second frequency greater than the first frequency; and a unit of the downhole tool that is powered using the second power signal. The downhole tool can include a transformer configured to transform a voltage of the second power signal and/or to galvanically isolate the downhole tool from a surface power supply. The transformer has a smaller size than another transformer that transforms the first power signal to a same power level as the transformer in order to power the unit. The bidirectional chopper includes a four switch section and receives a first pulse width modulated (PWM) signal at a first and third of the switch sections and a second PWM signal at a second and fourth of the switch sections to control the chopping of the first power signal, wherein the first PWM signal and the second PWM signal are 180 degrees out of phase and have a 50% duty cycle. At least one of the switch sections includes two transistors with antiparallel diodes, wherein the transistors include at least one of: (i) a silicon transistor; (ii) an insulated-gate bipolar transistor: (iii) a wide band-gap transistor; (iv) a silicon carbide transistor; and (v) a gallium nitride transistor.

In yet another embodiment, the present disclosure provides a system for operating a downhole tool, including: a power source configured to supply a first power signal at a first frequency; a bidirectional chopper configured to receive the first power signal and chop the first power signal to generate a second power signal having a second frequency greater than the first frequency; and a unit of the downhole tool configured to operate using the second power signal. The system can include a transformer configured to transform a voltage of the second power signal to output a signal at a selected power level. The transformer has a smaller size than another transformer that transforms the first power signal to output a signal at the selected power level. The bidirectional chopper includes four switch sections and at least one of the switch sections includes two transistors, each transistor having an antiparallel diode. The bidirectional chopper receives a first pulse width modulated (PWM) signal at a first and third of the switch sections and a second PWM signal at a second and fourth of the switch sections to control a chopping of the first power signal.

While the foregoing disclosure is directed to the certain exemplary embodiments of the disclosure, various modifications will be apparent to those skilled in the art. It is intended that all variations within the scope and spirit of the appended claims be embraced by the foregoing disclosure.

The invention claimed is:

1. A method of operating a downhole tool, comprising:
supplying an alternating current (AC) input power signal at a first frequency to the downhole tool from a power source;
chopping the AC input power signal at a bidirectional chopping circuit disposed in the downhole tool to generate an AC output power signal having a second frequency greater than the first frequency, the bidirectional chopping circuit including four switch sections, wherein the AC input power signal includes a first AC input signal received at a first and second switch section and a second AC input signal received at a third and fourth switch section and the AC output power signal includes a first AC output signal produced by the first and third switch sections and a second AC output signal produced by the second and fourth switch sections;
receiving the first AC output power signal at a transformer;
stepping down the voltage of the first AC output power signal at the transformer; and
operating motor electronics of the downhole tool based on the stepped down AC output power signal to operate a motor of the downhole tool.

2. The method of claim 1, further comprising using the transformer disposed in the downhole tool to perform at least one of: (i) change a voltage of the AC output power signal prior to using the AC output power signal to operate the downhole tool; and (ii) galvanically isolate the downhole tool from a surface power supply.

3. The method of claim 1, further comprising receiving a first pulse width modulated (PWM) control signal at the first and third switch sections and a second PWM control signal at the second and fourth switch sections.

4. The method of claim 3, wherein the first PWM signal and the second PWM signal are 180 degrees out of phase and have a 50% duty cycle.

5. The method of claim 3, wherein changing a duty cycle of the first PWM signal and the second PWM signal alters an amplitude of the AC output power signal.

6. The method of claim 3, wherein at least one of the switch sections includes two transistors with antiparallel diodes and the transistors include at least one of: (i) a silicon transistor; (ii) an insulated-gate bipolar transistor: (iii) a wide band-gap material transistor; (iv) a silicon carbide transistor; and (v) a gallium nitride transistor.

7. The method of claim 6, wherein the sources of the two transistors are electrically coupled and the gates of the two transistors are electrically coupled.

8. The method of claim 1, wherein the first frequency is in a range from about 50 Hertz (Hz) to about 60 Hz and the second frequency is in a range between about 400 Hz to about 1 kHz.

9. A downhole tool, comprising:
a bidirectional chopper disposed in the downhole tool that receives an alternating current (AC) input power signal at a first frequency and chops the AC input power signal to generate an AC output power signal having a second frequency greater than the first frequency, the bidirectional chopping circuit including four switch sections, wherein the AC input power signal includes a first AC input signal received at a first and second switch section and a second AC input signal received at a third and fourth switch section and the AC output power signal includes a first AC output signal produced by the first and third switch sections and a second AC output signal produced by the second and fourth switch sections;
a transformer that receives the first AC output power signal and steps down the voltage of the first AC output power signal; and
a motor electronics of the downhole tool operable based on the stepped down AC output power signal to operate a motor of the downhole tool.

10. The downhole tool of claim 9, wherein the transformer disposed in the downhole tool and configured to perform at least one of: (i) transform a voltage of the AC output power signal; and (ii) galvanically isolate the downhole tool from a surface power supply.

11. The downhole tool of claim 9, wherein bidirectional chopper receives a first pulse width modulated (PWM) signal at the first and third switch sections and a second PWM signal at the second and fourth switch sections to control the chopping of the AC input power signal, wherein the first PWM signal and the second PWM signal are 180 degrees out of phase and have a 50% duty cycle.

12. The downhole tool of claim 11, wherein at least one of the switch sections includes two transistors with antiparallel diodes and the transistors include at least one of: (i) a silicon transistor; (ii) an insulated-gate bipolar transistor: (iii) a wide band-gap material transistor; (iv) a silicon carbide transistor; and (v) a gallium nitride transistor.

13. A system for operating a motor of a downhole tool, comprising:
a power source configured to supply an alternating current (AC) input power signal at a first frequency;
a bidirectional chopper disposed in the downhole tool configured to receive the AC input power signal and chop the AC input power signal to generate an AC output power signal having a second frequency greater than the first frequency, the bidirectional chopping circuit including four switch sections, wherein the AC input power signal includes a first AC input signal received at a first and second switch section and a second AC input signal received at a third and fourth switch section and the AC output power signal includes a first output signal produced by the first and third switch sections and a second AC output signal produced by the second and fourth switch section; and
a transformer that receives the first AC output power signal and steps down the voltage of the first AC output power signal; and
a motor electronics of the downhole tool operable based on the stepped down AC output power signal to operate the motor of the downhole tool.

14. The system of claim 13, wherein the transformer disposed in the downhole tool and configured to transform a voltage of the AC output power signal to signal at a selected power level.

15. The system of claim 13, wherein at least one of the switch sections includes two transistors, each transistor having an antiparallel diode.

16. The system of claim 15, wherein the bidirectional chopper receives a first pulse width modulated (PWM) signal at a first and third of the switch sections and a second PWM signal at a second and fourth of the switch sections to control the chopping of the AC input power signal.

* * * * *